United States Patent [19]

Haddock

[11] 4,323,019

[45] Apr. 6, 1982

[54] METHOD AND APPARATUS FOR PLANTING SEEDLINGS

[75] Inventor: William H. Haddock, Garner, N.C.

[73] Assignee: North Carolina State University, Raleigh, N.C.

[21] Appl. No.: 105,766

[22] Filed: Dec. 20, 1979

[51] Int. Cl.³ .................................. A01C 11/02
[52] U.S. Cl. ................................ 111/2; 111/89; 175/238
[58] Field of Search ............... 111/2, 3, 4, 89, 90, 111/91; 172/25, 112, 113; 37/2, 142.5; 294/50.7, 50.8, 50.9; 175/263, 292, 232, 238; 405/241

[56] References Cited

U.S. PATENT DOCUMENTS 3,830,320  8/1974  Van Der Wijden ............. 175/238

FOREIGN PATENT DOCUMENTS

| 148975 | 7/1961 | U.S.S.R. | 111/89 |
| 207548 | 3/1968 | U.S.S.R. | 111/89 |
| 211915 | 4/1968 | U.S.S.R. | 111/89 |
| 309672 | 9/1971 | U.S.S.R. | 111/2 |
| 436631 | 1/1975 | U.S.S.R. | 111/2 |

*Primary Examiner*—James R. Feyrer
*Attorney, Agent, or Firm*—Bell, Seltzer, Park & Gibson

[57] ABSTRACT

A method and apparatus is provided for planting tree seedlings or the like. The apparatus includes an elongate tube, and a pair of blades pivotally mounted to the lower end of the tube. The blades are each pivotal between a closed position closing the lower end of the tube, and an open position wherein the lower end of the tube is open. In use, the lower end of the tube is rotatably advanced into the soil, with the rotating blades acting to pulverize the surrounding soil. Also, the blades will be pivoted to the closed position by the resistance of the soil, to prevent the soil from entering the tube. A seedling is then deposited downwardly through the tube, and the tube is rotated in the reverse direction to withdraw the tube from the soil. During reverse rotation, the blades pivot to their open position to permit the tube to lift from the seedling, and act to press and compact the soil about the roots of the seedling.

10 Claims, 9 Drawing Figures

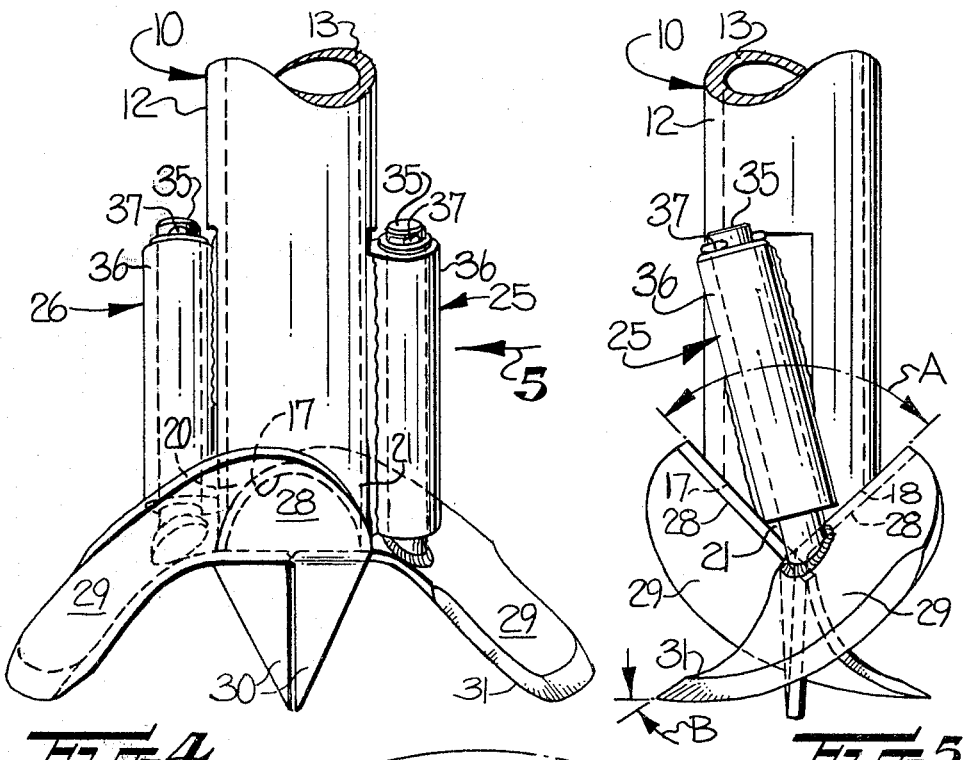
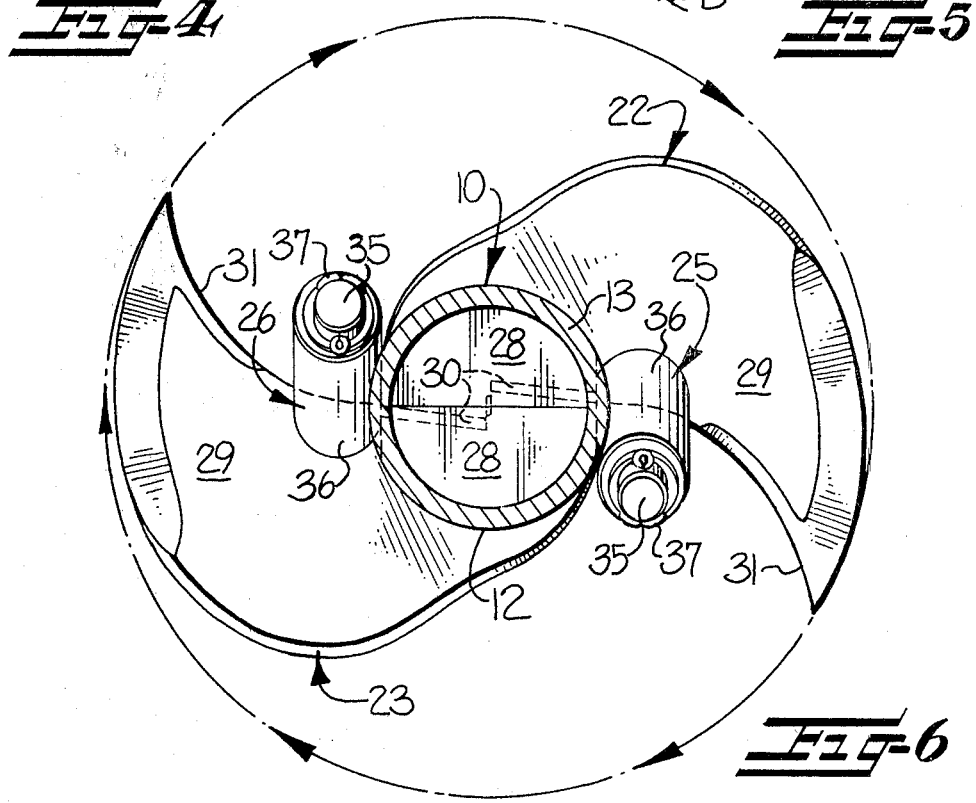

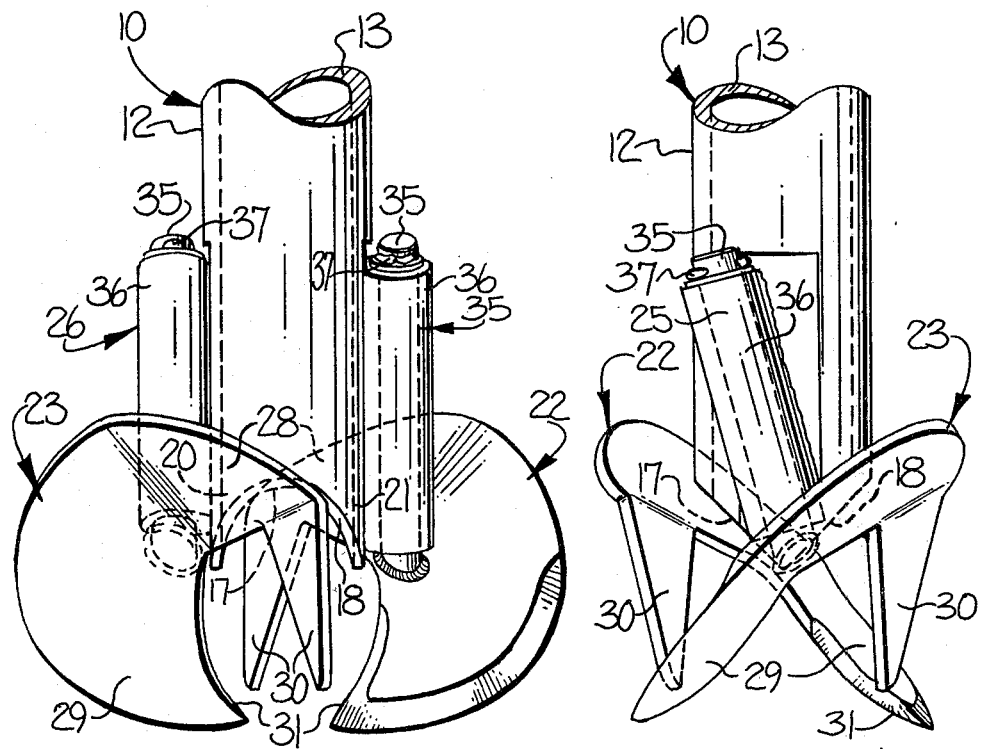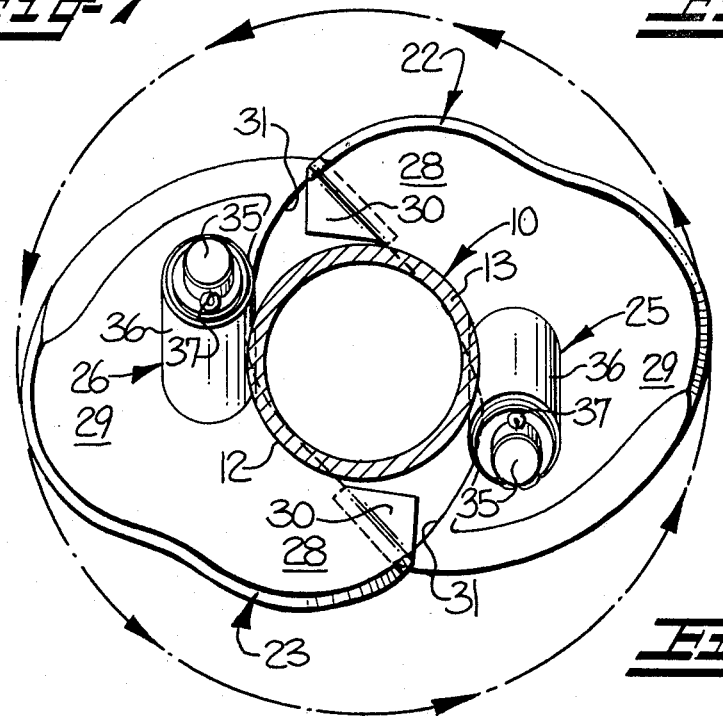

METHOD AND APPARATUS FOR PLANTING SEEDLINGS

The present invention relates to a method and apparatus for rapidly and efficiently planting tree seedlings or the like in the soil.

Forestry and agriculture are frequently concerned with planting or transplanting extensive acreage for crop production, reforestation, land reclamation, and other similar purposes. Particularly with regard to reforestation and afforestation, the preferred method of planting is by transplanting seedlings rather than by direct seedling, since the development of the seedlings can be closely controlled, and a higher quality planting stock can thereby be produced.

Seedlings are commonly planted manually by a procedure which involves the steps of striking the ground with a pointed instrument or dibble to form a hole, and then depositing the roots of the seedling in the hole. Finally, the soil is compacted about the roots by the workman pressing the ground around the seedling with his foot. As will be apparent, this procedure is laborious and time consuming, and it is not totally satisfactory in that little if any soil preparation or pulverization is achieved around the roots of the seedling and which is necessary to optimize seedling survival and growth.

Various mechanized transplanting apparatus have been developed in an effort to improve the speed and efficiency of the transplanting operation, and to improve ground preparation. One typical mechanized apparatus includes a crawler-tractor which pulls a plow to open a furrow along the ground. The seedlings are manually placed in the furrow by a workman riding in a sulky attached to the tractor, and a closure device is drawn behind the sulky to close the furrow along the roots of the seedling. While this apparatus greatly increases planting speed and achieves improved soil preparation, it is limited to use in a generally level area which is relatively clear of heavy brush, rocks, stumps or the like. Also, the required equipment is expensive, both to purchase and operate.

It is accordingly an object of the present invention to provide a method and apparatus for rapidly and efficiently planting tree seedlings or the like, and which overcomes the above deficiencies of the present systems.

It is a more particular object of the present invention to provide a lightweight, high speed, intermittent seedling planting apparatus, which is easily operated and low in cost.

It is still another object of the present invention to provide a method and apparatus of the described type which is adapted to plant either "bare-root" or "containerized" seedlings, and which is further adapted to pulverize the soil in an area surrounding the full depth of the roots of the seedling and then pack the pulverized soil about the roots.

These and other objects and advantages of the present invention are achieved in the embodiment illustrated herein by the provision of an apparatus which includes an elongate cylindrical tube, and a pair of blades pivotally mounted to the lower end of the tube and extending radially beyond the tube. The blades are configured to close the lower end and thread the tube downwardly into the soil upon rotation of the tube in a forward direction, and to open the lower end and thread the tube upwardly from the soil upon rotation of the tube in the reverse direction. Thus the lower end of the tube may be advanced into the soil with its lower end closed by rotating the tube in the forward direction, to thereby form a cylindrical cavity in the soil while the blades pulverize the soil immediately surrounding the cavity and along its full depth. The seedling may then be deposited downwardly through the inside of the tube to a level such that the roots are below ground level. The tube is then withdrawn from the soil with its lower end by rotating the apparatus in the reverse direction. The seedling passes through the open end of the rising tube, and the pulverized soil is compacted about the roots of the seedling by the reverse rotation of the blades which acts to press the pulverized soil downwardly.

Some of the objects having been stated, other objects will appear as the description proceeds, when taken in connection with the accompanying drawings in which FIGS. 1-3 are side elevation views of an apparatus embodying the present invention, and illustrating the sequential steps of the planting operation;

FIG. 4 is a fragmentary side elevation view of the lower end of the apparatus, with the blades disposed in their closed position;

FIG. 5 is a fragmentary side elevation view of the apparatus taken generally along the line 5 and at right angles to the view of FIG. 4;

FIG. 6 is a top plan view of the apparatus as shown in FIGS. 4 and 5; and

FIGS. 7-9 are views similar respectively to FIGS. 4-6, but with the blades disposed in their open position.

Figure 3:
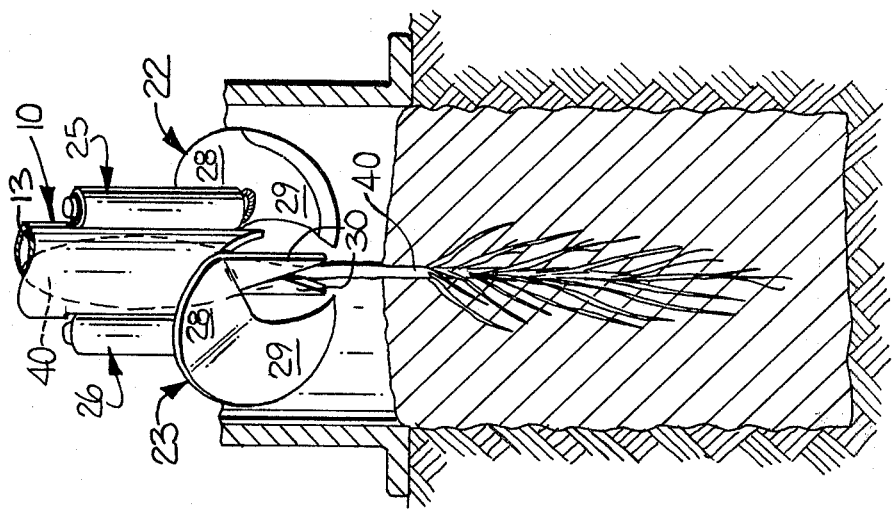

Referring more specifically to the drawings, an apparatus embodying the features of the present invention is illustrated generally at 10. The apparatus includes an elongate hollow tube 12 having a cylindrical wall 13 and an upper end (not shown) and a lower end. The upper end may if desired be attached to a suitable handle or mechanism (not shown) for facilitating the manual or power driven rotation of the tube for the purposes further described below. In this regard, the power mechanism may include a tubular support stand 15 which is adapted to surround the apparatus 10 in the manner illustrated in FIGS. 1-3. The lower end of the tube includes a pair of oppositely facing arch shaped openings 17, 18 in the wall, and which define a pair of opposing V-shaped segments 20, 21 of the wall of the tube, note FIGS. 5 and 8. A pair of blades 22, 23 are pivotally mounted to respective ones of the V-shaped wall segments by hinges 25, 26. The two blades 22, 23 are of like configuration, and are sized to extend radially beyond the periphery of the tube. More particularly, each blade includes a flat radially inner portion 28 and a downwardly and forwardly curved radially outer portion 29. A triangular, downwardly directed point 30 is fixed to the lower edge of the flat portion of the blade, and the outer portion of the blade includes an arcuately curved forward cutting edge 31.

Each of the hinges 25, 26 includes a post 35 fixed to the upper surface of the associated blade, and a mating tubular socket 36 fixed to the wall segment. The post is rotatably disposed in the socket and is held against axial withdrawal by a pin 37. In the illustrated embodiment, the socket 36 is inclined somewhat from a direction parallel to the axis of the tube 12. Thus each blade is mounted for pivotal movement about an axis which extends adjacent the periphery of the tube and in a direction having at least a substantial component which is parallel to the axis of the tube 12. Also, the blades are each pivotable for movement between a closed or rearward position (note FIGS. 4-6) wherein the flat portion 28 overlies and covers an associated arch shaped opening 17 or 18 of the tube, and an open or forward position (note FIGS. 7-9) wherein the flat portion is withdrawn from the associated arch shaped opening and so that the lower end of the tube is open.

The particular size of the tube 12 and geometry of the openings 17, 18 and blades 22, 23 may be chosen to best accommodate the size of the particular seedling being planted, and soil conditions. Typically, the inside diameter of the tube ranges between about two to four centimeters, and the outer diameter defined by the blades upon rotation of the tube is about three times the outer diameter of the tube, note FIGS. 6 and 9. The included angle A (note FIG. 5) of the V-shaped segments 20, 21 formed between the openings 17, 18 typically ranges between about sixty to ninety degrees. Also, while the illustrated blades have a right handed curvature, it will be appreciated that the apparatus could be designed using left handed blades.

The blade penetration angle B as shown in FIG. 5 may vary widely, for example, between about five to nearly ninety degrees depending upon soil conditions. For highly compacted soil, the blade angle should be relatively small to reduce the penetration force. A small penetration angle would also work in loosely compacted soils, but such loosely compacted soil does not need substantial pulverization, and a blade having a penetration angle of up to nearly ninety degrees could be employed and thereby eliminate the need for continuous rotation of the apparatus. However, some rotation is required for the purpose of opening and closing the openings 17, 18 at the lower end of the tube in the manner described above. In the illustrated embodiment, the axis of each socket 36 is inclined about fifteen degrees from the axis of the tube as viewed in FIG. 5, and it will be seen that the selected inclination permits the angle of blade penetration to be varied without modifying the configuration of the blade itself.

Figure 1:
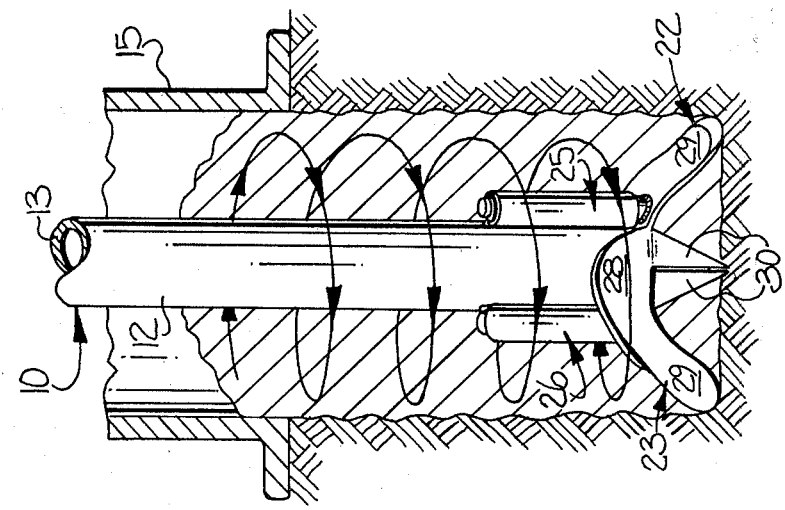

In use, the apparatus 10 is initially rotated in a forward direction as illustrated in FIG. 1 and such that the blades 22, 23 act to thread the tube into the soil. As will be apparent, the blades will be rotated on the hinges 25, 26 to their rearward position by the resistance of the soil to close the arch shaped openings 17, 18 and thus the lower end of the tube. Thus the advance of the tube downwardly into the soil acts to form a cylindrical cavity in the soil by moving the soil substantially radially with respect to the axis of the cavity. Since the lower end of the tube remains closed, no appreciable amount of the soil is able to enter and thus clog the interior of the tube. Further, the rotating blades act to concurrently pulverize the soil which immediately surrounds the cavity, and such pulverization is effected along the full depth and also below the cavity. In this regard, the points 30 assist in breaking and loosening the soil below the tube as it enters the soil.

Figure 2:
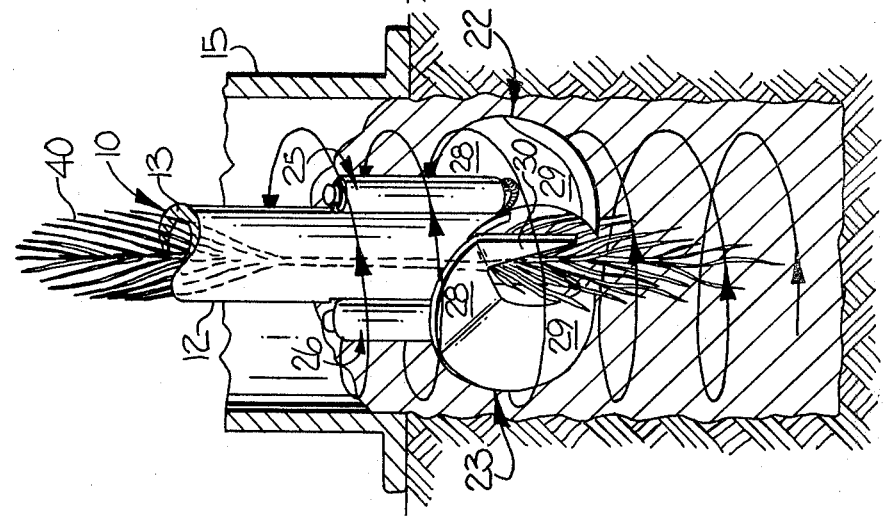

When the proper depth is reached, a seedling 40 is dropped through the tube so as to be deposited in the cavity in the soil at a level such that the foliage is above ground level and the roots are below ground level. The apparatus is then rotated in the reverse direction so as to be withdrawn from the soil as illustrated in FIGS. 2 and 3. Such reverse rotation causes the blades 22, 23 to be rotated to their forward position by the resistance of the soil, to thereby open the arch shaped openings and thus the lower end of the tube. The tube thus withdraws over the seedling 40, and the reverse rotation of the blades acts to press the pulverized soil downwardly, which in turn fills the cavity with pulverized soil and compacts the same about the roots of the seedling. Such packing may be facilitated by imparting a slight up and down movement to the apparatus, particularly where a high blade penetration angle is employed. Thus with the present invention, both soil pulverization and subsequent packing is effected along and beyond the full depth of the roots, which is desirable for optimizing seedling survival and growth.

It will also be apparent from the above description that the apparatus of the invention is applicable for planting both "bare-root" and "containerized" seedlings. In the case of "bare-root" seedlings, a pneumatic seedling feeding apparatus might be operatively connected to the tube 12 to insure that the seedlings drop downwardly through the tube and into the cavity formed in the soil. "Containerized" seedlings normally would not require such a pneumatic feeding system, and gravity alone is sufficient to insure movement of the seedlings through the tube.

As was pointed out briefly hereinabove, the upper end of the elongate hollow tube 12 of the apparatus 10 may, if desired, be attached to a suitable handle or mechanism (not shown) for facilitating operation as has now been described. As will be appreciated from the discussion of this invention, it is important that the tube 12 enter and leave the soil only in a vertical direction. That is, the operation of this apparatus would be impaired were there horizontal movement of the tube 12. Such avoidance of movement in an undesired or improper direction and manner may be achieved by intermittently stopping a carriage or the like on which the apparatus 10 is mounted or may be accomplished by other means including relatively moving elements, such as sliding frames or parallelogram linkages, which have the effect of reducing relative velocity between the apparatus 10 and the ground to zero. Persons familiar with the applicable arts of mechanisms and planting will be able, from the discussion below, to apply the present invention in such environments.

In the drawings and specification, there has been set forth a preferred embodiment of the invention, and although specific terms are employed, they are used in a generic and descriptive sense only and not for purposes of limitation.

That which is claimed is:

1. A method of planting tree seedlings or the like in the soil and comprising the steps of
positioning generally vertically with respect to the soil an elongate tube having a cylindrical wall, an open lower end, and at least one radially outwardly extending blade pivotally mounted on an axis extending adjacent to the wall of the tube and in a direction skewed relative to the longitudinal axis of the tube for movement by engagement with the soil between a forward position closing the lower end and rearward position opening the lower end, then
rotating the tube in a forward direction abouts its longitudinal axis and advancing the tube into the soil with the blade at a penetration angle in the range of from about five degrees to about eighty-nine degrees while forming a cylindrical cavity in the soil and pulverizing with the blade the soil which immediately surrounds the cavity, then depositing a seedling downwardly into the cavity and such that the foliage is above ground level and the roots are below ground level, and rotating the tube in a rearward direction about its longitudinal axis and withdrawing the tube from the soil while moving the blade to the rearward position and opening the lower end and passing the seedling therethrough and compacting with the blade the soil which immediately surrounds the seedling roots.

2. The method as defined in claim 1 wherein the step of forming a cylindrical cavity includes moving the soil substantially radially with respect to the axis of the cavity, and the soil is pulverized to a level below the bottom of the cavity.

3. The method as defined in claim 1 wherein the step of depositing a seedling into the cavity includes moving the seedling axially along the interior of the cylindrical tube.

4. A raisable, lowerable powered auger apparatus for facilitating the planting of a tree seedling or the like in the soil, and comprising a reversibly rotatable elongate tube having a cylindrical wall and a lower end, blade means pivotally mounted to said lower end of said tube and extending radially beyond said tube for closing said lower end and for engaging soil at a penetration angle in a range of from about five degrees to about eighty-nine degrees and threading the tube downwardly into the soil upon rotation of the tube in a forward direction, said pivotal mounting of said blade means accommodating rotation of said blade means about an axis extending adjacent the periphery of said tube and in a direction skewed relative to the longitudinal axis of said tube in response to the resistance of the soil for opening said lower end and threading the tube upwardly from the soil upon rotation of the tube in the reverse direction, whereby the lower end of the tube may be advanced into the soil with its lower end closed by rotating the tube in the forward direction to thereby form a cylindrical cavity in the soil while pulverizing the soil immediately surrounding the cavity, and the tube may be withdrawn from the soil with its lower end open by rotating the tube in the reverse direction.

5. The apparatus as defined in claim 4 wherein said blade means comprises a pair of blades each pivotally mounted to said tube and extending radially beyond the periphery of said tube.

6. A raisable, lowerable powered auger apparatus for facilitating the planting of a tree seedling or the like in the soil, and comprising a reversibly rotatable elongate tube having a cylindrical wall and a lower end, said lower end including a pair of oppositely facing arch shaped openings in the wall thereof and defining a pair of opposing V-shaped segments of the wall of said tube, a pair of blades pivotally mounted to respective ones of said V-shaped wall segments, with each blade including a flat radially inner portion and a downwardly and forwardly curved radially outer portion, said blades being pivotally movable between a rearward position wherein said flat portion overlies and covers an associated arch shaped opening of said tube and a forward position wherein said flat portion is withdrawn from the associated arch shaped opening, said tube and blades cooperating upon the tube being rotated in the forward direction into the soil for rotating the blades to their rearward position by the resistance of the soil to close the arch shaped openings and thus the lower end of the tube, and upon the tube being rotated in the reverse direction, for rotating the blades to the forward position by the resistance of the soil to open the arch shaped openings and thus the lower end of the tube to permit a seedling to pass through the open lower end.

7. A raisable, lowerable powered auger apparatus for facilitating the planting of a tree seedling or the like in the soil, and comprising a reversibly rotatable elongate tube having a cylindrical wall and a lower end, said lower end including a pair of oppositely facing arch shaped openings in the wall thereof and defining a pair of opposing V-shaped segments of the wall of said tube, a pair of blades of like configuration pivotally mounted to respective ones of said V-shaped wall segments, with each blade including a flat radially inner portion and a downwardly and forwardly curved radially outer portion and being sized to extend radially beyond the periphery of said tube in each of a forward position and a rearward position, said blades being pivotally movable between the rearward position wherein said flat portion overlies and covers an associated arch shaped opening of said tube and the forward position wherein said flat portion is withdrawn from the associated arch shaped opening, whereby upon the tube being rotated in the forward direction into the soil, the blades are rotated to their rearward position by the resistance of the soil to close the arch shaped openings and thus the lower end of the tube, and upon the tube being rotated in the reverse direction, the blades are rotated to the forward position by the resistance of the soil to open the arch shaped openings and thus the lower end of the tube to permit a seedling to pass through the open lower end.

8. The apparatus as defined in claim 7 wherein each of said blades further comprises a downwardly extending pointed portion fixed to the lower edge of said flat portion for assisting in breaking of the soil below the tube upon entry into the soil.

9. The apparatus as defined in any of claims 6, 7, or 8 wherein said blades are each mounted for pivotal movement about an axis which extends adjacent the periphery of the tube and in a direction having at least a substantial component which is parallel to the axis of the tube.

10. The apparatus as defined in claim 8 wherein the pivotal axis of each of said blades is inclined with respect to the axis of the tube in a direction which serves to increase the angle of penetration of the blade into the soil upon forward rotation of the tube.

* * * * *